(No Model.)

W. L. JOHNSON.
HOSE COUPLING.

No. 457,724. Patented Aug. 11, 1891.

WITNESSES:
F. M. Ardle.
E. M. Clark

INVENTOR:
W. L. Johnson
BY Munn & Co.
ATTORNEYS

UNITED STATES PATENT OFFICE.

WILLIAM L. JOHNSON, OF POMONA, CALIFORNIA.

HOSE-COUPLING.

SPECIFICATION forming part of Letters Patent No. 457,724, dated August 11, 1891.

Application filed June 13, 1891. Serial No. 396,147. (No model.)

*To all whom it may concern:*

Be it known that I, WILLIAM L. JOHNSON, of Pomona, in the county of Los Angeles and State of California, have invented a new and Improved Hose-Coupling, of which the following is a full, clear, and exact description.

My invention relates to an improvement in hose-couplings, and has for its object to provide a spring-controlled latch for one coupling capable of expeditious and convenient manipulation in effecting a quick, firm, and close connection with an opposed coupling.

A further object of the invention is to provide a lock-latch for a coupling which shall be of simple and economic construction.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1:
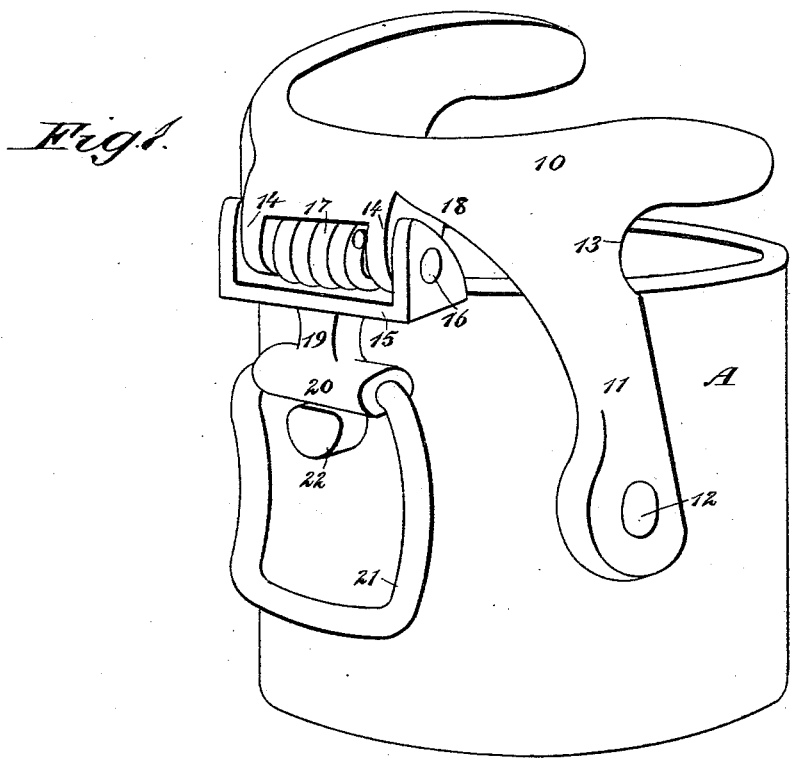
Figure 2:
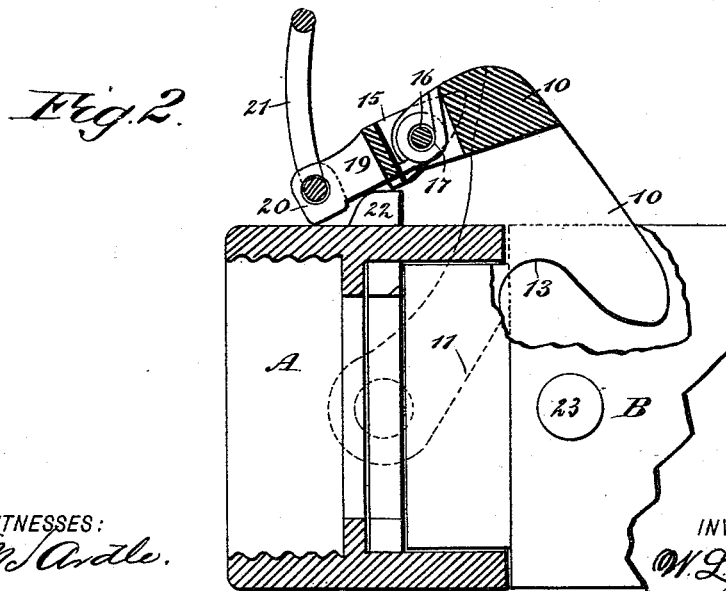

Figure 1 is a perspective view of the coupling having the latch applied thereto and illustrating the latch in its locked position; and Fig. 2 is a vertical section through the coupling carrying the latch, the latch being also in section, and a partial side elevation of an opposing coupling.

The coupling A, carrying the latch, is a female coupling, and the latch consists of a metal bail 10, having projected from its inner side near its lower ends arms 11, which arms extend inwardly and downwardly and are fulcrumed or pivoted upon the coupling at opposite sides thereof in any suitable or approved manner, the arms being usually provided with eyes through which trunnions 12, formed integral with or attached to the coupling, extend. At the junction of the arms 11 with the bail 10 semicircular or cylindrical recesses 13 are produced in the under side of the arms and partly in the bail. In front elevation the bail is semicircular, and at its central portion rearwardly-extending ears 14 are formed, while a yoke 15 is pivotally connected with the ears through the medium of a pin 16 or the equivalent thereof. A spring 17 is coiled around the pin, one end of the spring having a bearing against the rear face of the bail and the other end of the spring being attached to the yoke 15. Inclined recesses 18 are made in the bail adjacent to the ears 14, and the pivoted members of the yoke 15 are beveled at their outer ends to engage with the recesses 18, which are likewise beveled or inclined, as illustrated in Fig. 1. The yoke 15 is constructed with a shank 19, terminating in an eye 20, and in the eye a metal link or loop 21 is pivoted. In the line of travel of the yoke a lug 22 is produced upon the coupling A, which lug is preferably located centrally between the trunnions 12, pivoting the bail, and the inner or rear face of the lug 22 is more or less beveled, as illustrated in Fig. 2. The lug 22 is adapted to act in the capacity of a stop.

The male section B of the coupling is provided at opposite sides with circular posts or studs 23, and in the operation of coupling the bail 10 is located vertically with respect to the mouth of the female section, and its recessed surfaces 13 engage with the posts or studs 23 of the female coupling, and the bail is held in positive engagement with the male section and its posts or studs through the medium of the spring-controlled yoke 15. The bail cannot under any possibility be forced upward without being moved rearward, and this movement when the bail is in its locked position is impossible, as the eye 20 of the yoke has a bearing against the front face of the lug 22 upon the female coupling.

When it is desired to uncouple, the operator grasps the link 21 and lifts the yoke 15 upward against the tension of the spring 17, and as soon as the eye of the yoke is at the top of the lug 22 the yoke is permitted to slide down the inclined surface of the lug, which action carries the bail to the upper rearwardly-inclined position, as indicated in Fig. 2.

In coupling, when the male section has been entered into the female section by means of the link 21, the yoke is carried forward until its eye 20 engages with the lug 22, and, as heretofore stated, when this position is assumed the bail will have engaged with the posts or studs of the male section and will have clamped the upper surface thereof. By reason of the rearward and downward inclination of the arms 11 of the bail the recesses 13, engaging with the posts or studs of an opposing coupling, are more or less cam-recesses.

Having thus described my invention, I claim as new and desire to secure by Letters Patent—

1. The combination, with a hose-coupling, of a latch consisting of a bail normally located in front of one end of the coupling, provided with rearwardly and downwardly extending arms pivoted to the coupling and semicircular recesses at the junction of the arms with the bail, a spring-controlled yoke pivoted to the rear portion of the bail, a lifting device connected with the yoke, and a lock located upon the coupling, adapted as a stop for the yoke and to maintain the bail in a locked position, substantially as described.

2. The combination, with a coupling, of an essentially semicircular bail vertically located with respect to the front of the coupling and extending beyond said front, the said bail being provided with rearwardly and downwardly extending arms pivoted to the coupling at opposite sides and cam-recesses at the junction of the arms with the bail, a lug formed upon the coupling and having an inclined rear face, and a spring-controlled yoke pivotally attached to the bail between its arms and provided with an eye having an attached lifting device, which eye is adapted for engagement with the lug, as and for the purpose set forth.

3. The combination, with two engaging sections of a hose-coupling, one section being provided with posts or studs at opposite sides and the other with a lug upon its upper surface, of a latch pivoted upon one coupling, essentially U-shaped in front elevation and extending beyond one face of said coupling, the said bail being provided with inwardly and downwardly extending arms pivoted to the coupling and cam-recesses at the junction of the arms with the bail, adapted to receive and engage with the posts or studs of an opposed coupling, a spring-controlled yoke pivoted to the bail between its arms, adapted for engagement with the lug upon the coupling having the latch attached, and a lifting device connected with the yoke, substantially as specified.

WILLIAM L. JOHNSON.

Witnesses:
HARRISON MILLER,
ARCHIE THOMPSON.